United States Patent
Lin et al.

(10) Patent No.: US 7,178,123 B2
(45) Date of Patent: Feb. 13, 2007

(54) SCHEMATIC DIAGRAM GENERATION AND DISPLAY SYSTEM

(75) Inventors: Po-Hung Lin, Zhubei (TW); Shyh-Chang Lin, Hsinchu (TW)

(73) Assignee: Springsoft, Inc., Hsinchu (TW)

(*) Notice: Subject to any disclaimer, the term of this patent is extended or adjusted under 35 U.S.C. 154(b) by 170 days.

(21) Appl. No.: 10/975,151

(22) Filed: Oct. 27, 2004

(65) Prior Publication Data

US 2006/0090152 A1 Apr. 27, 2006

(51) Int. Cl.
*G06F 17/50* (2006.01)

(52) U.S. Cl. .......................... 716/11; 716/12; 716/14; 716/17

(58) Field of Classification Search .................. 716/1, 716/8, 11, 12, 14, 17
See application file for complete search history.

(56) References Cited

U.S. PATENT DOCUMENTS 5,903,886 A * 5/1999 Heimlich et al. ............. 706/50
6,851,094 B1 * 2/2005 Robertson et al. ........... 716/1

* cited by examiner

Primary Examiner—Thuan Do
(74) Attorney, Agent, or Firm—Daniel J. Bedell; Smith-Hill and Bedell

(57) ABSTRACT

A system for processing a netlist description of a circuit to generate a display of a schematic diagram including representations of cells and nets first determines positions of the cell instance representations within the schematic diagram and then displays the schematic diagram, including the cell instance representations but no representations of the nets. When a user requests a zoom in operation to display a smaller portion of the schematic diagram at a scale at which net representations can be viewed, the system determines routes for representations of nets that are to reside in that portion of the schematic diagram and then displays those net representations upon zooming in to that portion of the schematic diagram. When the user requests a pan operation to shift the display to another portion of the schematic diagram, the system determines routes for representations of nets that are to reside in that other portion of the schematic diagram and then displays those net representations upon panning to that other portion of the schematic diagram.

34 Claims, 2 Drawing Sheets

SCHEMATIC DIAGRAM GENERATION AND DISPLAY SYSTEM

BACKGROUND OF THE INVENTION

1. Field of the Invention

The invention relates in general to a system for processing a netlist description of a circuit to generate and display a schematic diagram, and in particular to a system that performs net routing on demand as a user zooms and pans the schematic diagram display.

2. Description of Related Art

An integrated circuit (IC) design engineer typically produces an IC design in the form of a gate level netlist indicating the various components ("cell instances") to be included in the IC and indicating how their terminals are to be interconnected through nets. The designer can provide a netlist model of an IC as part of a test bench input to a computer-based circuit simulator to determine how the IC described by the netlist will behave, or as input to a placement and routing tool to determine where to place each cell instance within an IC layout and how to route the nets interconnecting the cell instances.

While a netlist makes a suitable input to a circuit simulator or placement and routing tool, it is not always easy for a human to comprehend how signals flow within a circuit by looking only at a text-based netlist model of the circuit. A schematic diagram provides a graphical view of a circuit, using graphical symbols to represent various types of cell instances and lines to represent nets interconnecting the cell instances making in easier for a designer to visualize the nature of the cell instances forming a circuit, the manner in which they are interconnected through nets, and the manner in which signals propagate through the circuit. A designer can employ a computer-aided schematic diagram generator to convert a netlist model of an IC into a schematic diagram model and to display it on a video monitor.

A typical schematic diagram generation system tries to produce a schematic diagram that makes it as easy as possible to trace the flow of information through the circuit it depicts. For example a typical schematic diagram generator tries to position representations of cell instances within a schematic diagram so that each cell instance is to the right of cell instances providing its input signals, and in a way that tries to minimize the number of intersections between nets and the number of jogs within each net interconnecting the cell instances. After positioning the cell instances, a typical schematic diagram generator then determines how to route nets between the cell instances in a way that avoids net overlap and provides sufficient separation between nets to avoid "visual crosstalk" when the schematic diagram is displayed at some minimum resolution. After determining a position for each cell instance representation and a route for each net, the system generates a display of the schematic diagram.

Display monitors normally do not have sufficient size or resolution to display the entire schematic diagram of a large circuit in a way that representations of cell instances and nets are clearly distinguishable. But a user can command a display system to zoom into some smaller portion of the schematic diagram, to display that portion of the schematic diagram with higher resolution, thereby allowing the user to clearly distinguish representations of all cell instances and nets in that area of the schematic. The user may also pan the display to show other areas of the schematic diagram with similar resolution.

One difficulty with prior art schematic diagram generators has been that they often take too long to produce a schematic diagram display for a large IC design. For example one conventional schematic diagram generator required about 6 hours to generate and display a schematic diagram for an IC having about 1.1 million cell instances.

One way prior art schematic diagram generators reduce the time required to generate a schematic diagram has been to reduce the complexity of the placement and routing algorithms employed by allowing the algorithms to violate some of criteria for the schematic diagram, for example by allowing excessive numbers of crossovers and jogs in the lines representing nets. But this can degrade the quality of the schematic diagram by making it more difficult for a user to trace signal paths through the circuit. Another way to reduce schematic diagram generation time is to partition the circuit design into separate sub-designs and to generate a separate schematic diagram display for each sub-design. But this "paginated" approach to schematic diagram generation fails to provide a full schematic diagram for the circuit and makes it difficult for a designer to trace signal flows over the entire design by preventing the designer from being able to smoothly pan the schematic diagram.

What is needed is a system for generating and displaying a full, un-paginated schematic diagram with less apparent delay.

BRIEF SUMMARY OF THE INVENTION

The invention relates to a system for processing a netlist description of a circuit to generate a display of a schematic diagram including representations of cell instances and nets described by the netlist. The system first determines a position for each cell instance representation within the schematic diagram and then displays the schematic diagram, including the cell instance representations, but without including representations of the nets. When a user requests the system to zoom in to a smaller portion of the schematic diagram that can be displayed with a resolution at which net representations can be viewed, the system determines routes for representations of nets that are to reside in that portion of the schematic diagram, and then displays those net representations upon zooming the display in to that small portion of the schematic diagram.

When the user thereafter requests a pan operation to shift the display to another portion of the schematic diagram, the system determines routes for representations of nets that are to reside in that other portion of the schematic diagram and then displays those net representations upon panning to that other portion of the schematic diagram, Thus rather than determining detailed net routing for an entire schematic diagram before generating the schematic display, the system carries out detailed net routing incrementally and "on demand" whenever the user wants to view a new portion of the schematic diagram that the user wants in sufficient detail to distinguish individual nets. Since the time required to carry out detailed routing for a small portion of a schematic diagram is much smaller than the time required to carry out detailed routing for the entire schematic diagram, the user does not perceive long processing delays.

The claims appended to this specification particularly point out and distinctly claim the subject matter of the invention. However those skilled in the art will best understand both the organization and method of operation of what the applicants consider to be the best mode of practicing the invention, together with further advantages and objects of the invention, by reading the remaining portions of the specification in view of the accompanying drawing(s) wherein like reference characters refer to like elements.

DETAILED DESCRIPTION OF THE INVENTION

The present invention relates to software stored on computer-readable media, which when read and executed by a conventional computer causes the computer to generate and display a schematic diagram of a circuit, such and an IC, described by a netlist. Suitable computer-readable media includes, but is not limited to compact disks, floppy disks, hard disk drives, and computer memory, While the specification describes at least one exemplary embodiment of the invention considered a best mode of practicing the invention, the invention is not limited to the particular example(s) described below or to the manner in which they operate.

Figure 1:
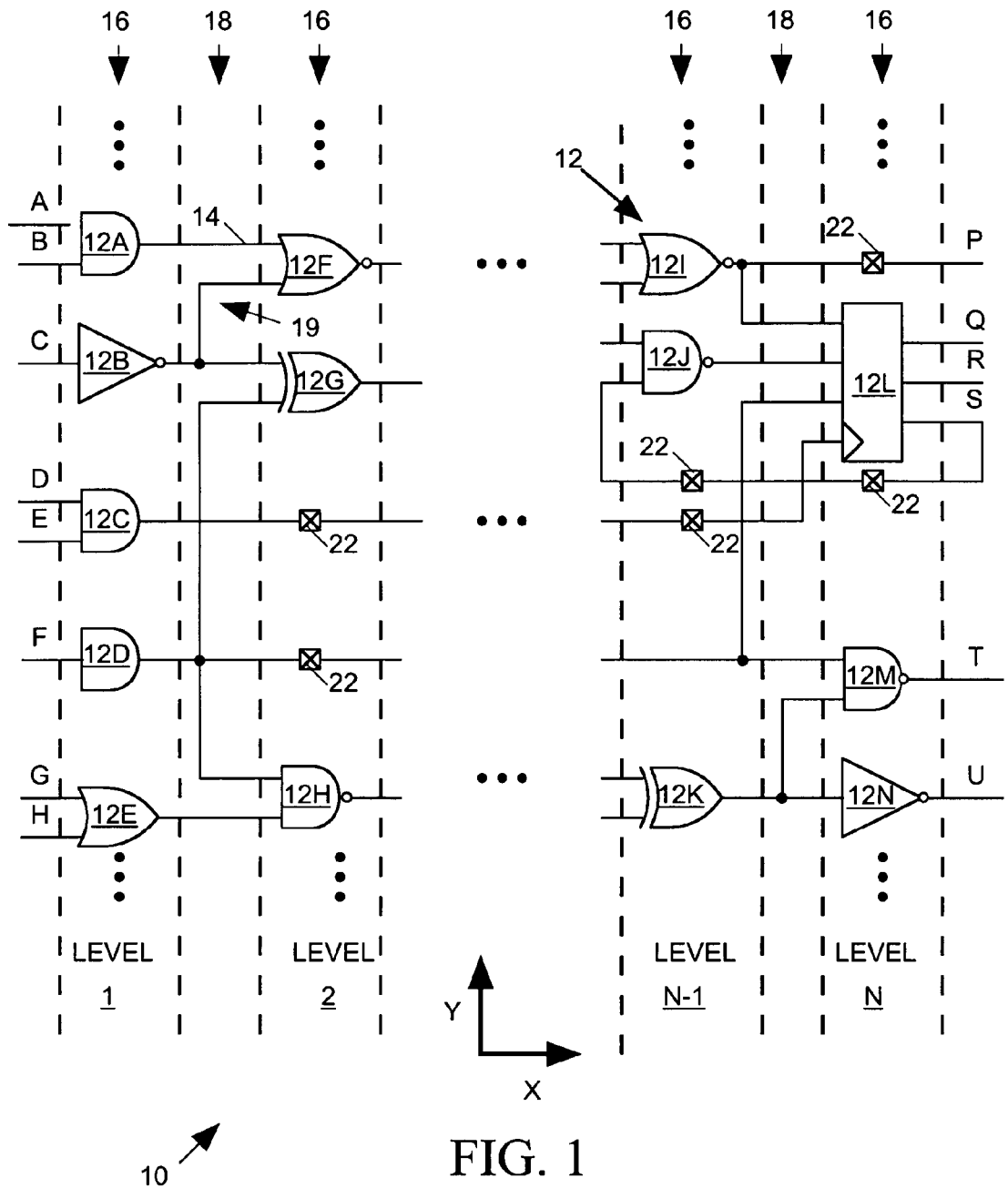
FIG. 1 is a partial view of a schematic diagram.

FIG. 1 is a partial view of a schematic diagram 10 as might be generated and displayed by a conventional computer system programmed by software in accordance with the present invention. Schematic diagram 10 uses symbols as representations 12 of instances of circuit components ("cells") such as for example logic gates, registers, transistors, and the like, and uses lines to represent the nets 14 that interconnect cell instances. The schematic diagram 10 positions each cell instance representation 12 within one of a set N of elongate, rectangular "levels" 16, each extending in a vertical (Y) direction with the plane of the schematic diagram. FIG. 1 shows only a portion of each of only four of the N levels. Levels 16 are spaced apart in the horizontal (X) direction to provide channels 18 for routing nets 14 between the adjacent levels 16. (The X-Y coordinates and the dashed lines separating levels and channels appear in FIG. 1 for illustrative purposes only and do not appear in the schematic diagram display.)

A designer typically generates an IC design in the form of a netlist, a text-based description of the cell instances forming the IC and the nets interconnecting the cell instances. One reason a circuit designer may want to view a schematic diagram of an IC described by a netlist is because it can be easier for the designer to trace signal flows through a schematic. The schematic diagram generator positions cell instances so that, to the extent possible, each cell instance resides to the right of cell instances supplying that cell's input signals and to the left of cell instances that receive its output signals , though this is not always possible when the IC contains feedback paths. The schematic diagram generator also tries to make tracing signal flows easy by positioning cell instances so as to minimize net lengths, to minimize the number of jogs in each net, and to minimize the number of times nets cross over one another. The generator also routes the nets to maintain minimum spacing between net sections to avoid visual crosstalk when a portion of the schematic diagram is displayed with sufficiently high resolution.

One drawback to prior art schematic diagram generation and display systems is that it can be very time-consuming for them to generate a schematic diagram, particularly for large ICs containing many nets. Generally it is not too time-consuming to determine where to place cell instances within the schematic diagram, but it can be very time-consuming to determine how to route the nets in a way that minimizes crossovers, jogs and visual crosstalk.

The invention relates to an improved method for generating and displaying a schematic diagram in a way that decreases the apparent processing delay. The invention makes use of the fact that the size and resolution of a typical display monitor is much too low to display an entire schematic diagram of a large IC in sufficient detail to enable a user to distinguish one net from another. To view a schematic diagram in sufficient detail to see individual nets, the user must command the display system to zoom into a small portion of the schematic diagram. A user will therefore be able to view only a small portion of a schematic diagram in sufficient detail to distinguish on net from another and the user must pan the display to view other portions of the schematic diagram at a similar level of detail.

When processing a netlist describing a large circuit that would require a substantial amount of processing time to establish routes for all of the circuit's nets, a schematic diagram generation and display system initially determines only where to position representations of all of the cell instances and how to size the channels for routing nets. It then generates a display of the entire schematic diagram showing positions of cell instances, but not depicting any of the nets are routed. The system defers the actual detailed routing of the nets within the channels until a user zooms into a portion of the schematic diagram that can be displayed in sufficient detail for the user to distinguish individual nets. At that point the system determines the detailed routing of the nets residing only in the channels passing through that small portion of the schematic and then generates the display of that portion of the schematic, including representations of both cells and nets. Since only a small portion of the channels are displayed, the system can carry out the detail net routing for the nets within those channels quickly, with relatively little lag between the time the user requests the zoom in operation and the time the system actually updates the display in response to the user's request. As the user thereafter pans the display horizontally to bring other channels into view, the system carries out detailed routing only for the newly displayed channels, thereby minimizing any lag in display update as the user pans.

Figure 2:
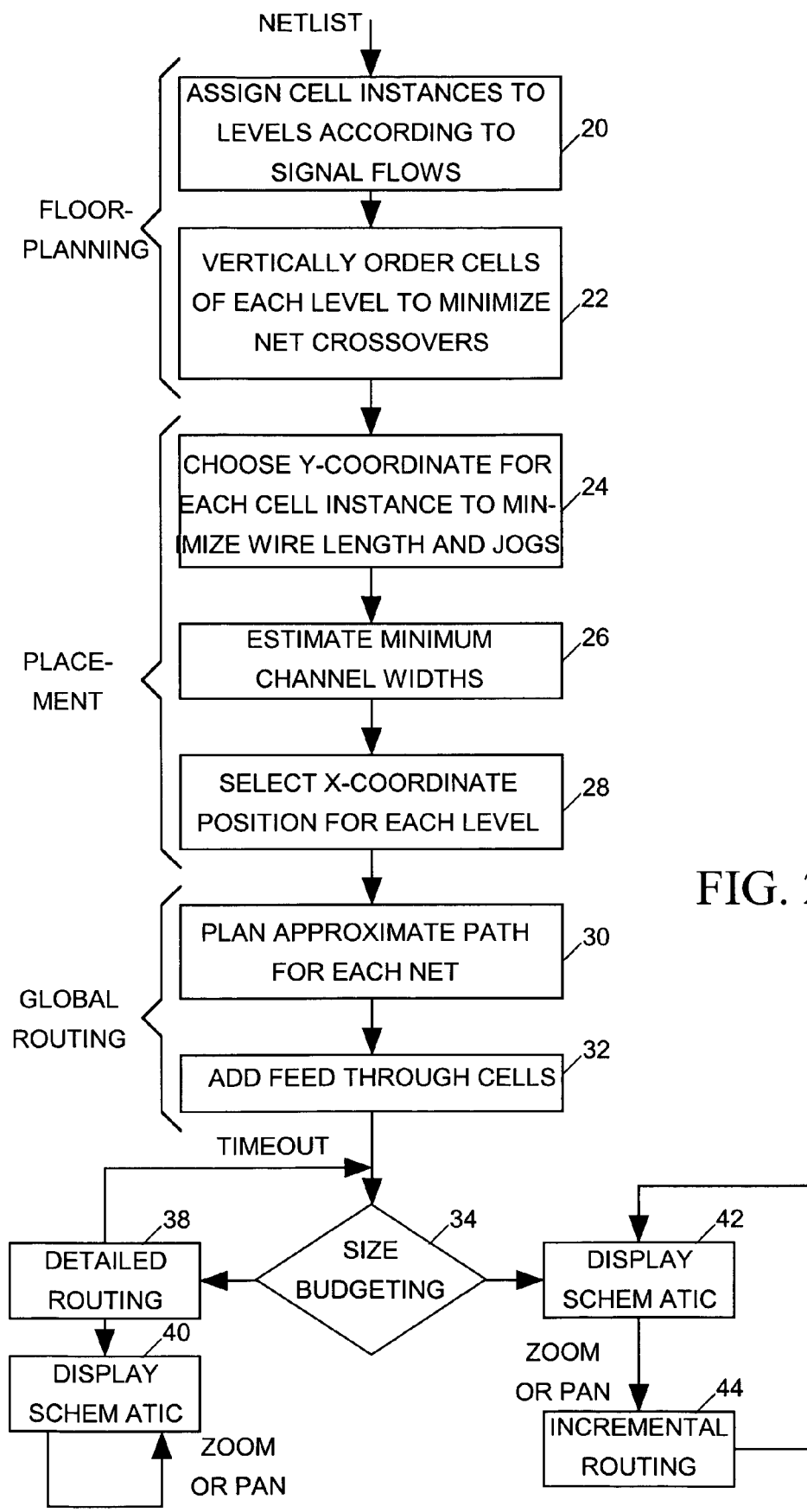
FIG. 2 is a data flow diagram illustrating a schematic diagram generation and display system in accordance with the invention.

FIG. 2 is a data flow diagram illustrating a method carried out by a system in accordance with the invention for generating and displaying a schematic diagram based on a netlist description of an IC or other circuit. Referring to FIGS. 1 and 2, the system initially (step 20) processes the netlist to assign each cell instance referenced by the netlist to an appropriate one of levels 16 of schematic diagram 10. In particular, the system analyzes the netlist to determine how signals flow through the circuit and to the extent possible, positions cell instances in the order in which they are affected by changes in the IC's input signals. For example, the system assigns the cell instances 12A–12E receiving the IC's input signals A–H to the left-most level (Level 1) of schematic diagram 10 and assigns the cell instances 12L–12N producing the IC's output signals P–U to the right-most level (Level N). All other cell instances, including each of instances 12F–12K, are assigned to intermediate levels 2 through (N–1), each cell resides to the right (+X direction) of the cells providing its input signals and to the left (–X direction) of cells receiving its output signals, except for some cell instances included in feedback loops. For example since an output signal S of cell instance 12L is fed back to an input of cell instance 12J, cell instance 12L cannot reside to the left of all cell instances providing its input signals.

The system next sorts the cells 12 for each level 16 to minimize the number of crossover signal flows (step 22) which occur whenever one net 14 crosses over another in the schematic diagram. For example in schematic diagram 10, the net 14 driven by the output of cell instance 12D crosses over the net driven by the output of cell instance 12C. The system could eliminate this crossover by repositioning cell instance 12C within level 1 so that it resides below cell 12E, however this may create a crossover in some other channel 18 to the right. Thus while the system may not be able to vertically sort cell instances 12 along levels 16 in a way that eliminates all signal flow crossovers, it vertically sorts them so as to minimize signal flow crossovers.

With cell instances 12 properly sorted in the vertical direction within each level, the system next selects the vertical positions (in the Y-direction) of all cell instances within their assigned level 16 to minimize the lengths and number of jogs 19 in the nets that will be connected to its input and output signals (step 24). For example the system has positioned cell instances 12B and 12G so that a straight line can represent the portion of the net interconnecting them. However, the net at the output of cell instance 12B also provides an input to cell instance 12F, and it is necessary for the system to use a line having a single jog 19 to represent this portion of the net. If the system had positioned cell instance 12B between cell instances 12F and 12G in the vertical (Y) direction, then the net at the output of cell instance 12B would require two jogs to reach cell instances 12F and 12G. The relative positioning of cell instances 12B, 12F and 12G is therefore preferable because it minimizes the number of jogs in the net interconnecting them and also minimizes net lengths.

The system's next step (step 26) is to estimate the minimum widths of the channels 18 between levels 16 necessary to accommodate the nets 14 to be routed with in those channels based on the number of nets that will be required. The system then positions each level 16 along the X axis of schematic diagram 10 to ensure that each channel 18 is of its estimated minimum width (step 28). This fixes the position of each cell instance representation in the horizontal (X) direction.

The next steps are to plan an approximate route for each net to determine vertical (Y-direction) positions along each level 16 at which the net may cross (step 30), and to then add a "feed through" cell instance 22 at each identified crossover position (step 32). The feed through cell instances 22 do not appear in the schematic diagram when displayed; they are used only as markers for the net crossover positions during subsequent detailed routing operations so that the system can carry out net routing independently within each channel 18.

At this point the system has completed floor planning (steps 20 and 22), cell placement (steps 24, 26 and 28) and global routing (steps 30 and 32). The X and Y coordinates of all cell instance representations have been selected and the only remaining tasks are to establish the routing of nets within channels 18 and to generate the schematic diagram display. Typically the system can carry out the floor planning, placement and global routing processes very quickly, even for relatively large ICs, but the process of determining the detailed routing for the nets within all of channels 18 can be time-consuming, particularly for large ICs having large numbers of nets. The system therefore next carries out a size budgeting step (step 34) wherein it determines whether it should carry out the detailed routing for all channels (step 38) before displaying the schematic diagram (step 40), or whether it should display the schematic diagram first (step 42) before it carries out any of the detailed routing (step 44).

When the IC is small, the time required to determine detailed routing for the entire IC is likely to be small, so the size budgeting step 34 tells the system to carry out detailed routing for the entire IC at step 38 and to then display a view of the entire schematic diagram on a display monitor at step 40. Depending on the size of the schematic diagram, this view may or may not provide sufficient resolution for the user to distinguish individual nets, but the user may command the system to zoom in on a portion of the schematic diagram to display that portion in more detail so that individual nets can be seen, and may thereafter command the system to pan to another portion of the display.

When the IC is relatively large having many cell instances and nets, the time required to carry out detailed routing for the entire IC is likely to be large, so the size budgeting step 34 tells the system to immediately display a view of the entire schematic diagram on a display monitor at step 42 without first determining detailed net routing. In this full view of the schematic diagram, the user will not be able to perceive that the detailed routing is incomplete. When the user thereafter commands the system to zoom into some portion of the schematic diagram for which the detailed net routing can be perceived within the particular channels passing through that portion of the schematic diagram, the system performs the detailed routing only for those channels (step 44) before it updates the display at step 42 to show that portion of the schematic diagram. Since the system need only perform detailed routing at step 44 for a relatively small percentage of the schematic diagram's channels, it can do so relatively quickly so that the user perceives only a relatively small delay between the time the user issues the zoom in command and the time the system updates the display in response to that command. Thereafter whenever the user issues a command to pan to another section of the schematic diagram, the system performs detailed routing only for those channels passing through that section of the schematic diagram for which it has not yet carried out detailed routing. The system thus carries out detailed routing incrementally in response to the user's demands to view various sections of the schematic in greater detail.

Thus while total amount of processing time the system of the present invention requires to perform detailed routing incrementally at step 44 may be no shorter than the time it would otherwise require to carry out detailed routing in one pass, a user is less likely to perceive any portion of that processing time as an objectionably long delay in generating or updating the schematic diagram display. In alternative embodiments of the invention, the system may also carry out step 44 in the background while the user is view some portion of the schematic diagram display, performing detailed routing for nets residing in channels not currently visible in the display, preferably for unrouted channels nearest channels currently visible in the display. These nearest neighbor channels are most likely to be subsequently viewed when the user pans the display.

Size budgeting step 34 may use any of several approaches to determine whether to perform detailed routing in one pass (step 38) or incrementally (step 44). For example it may base the decision on whether the number of cell instances, nets or channels in the schematic diagram, or some weighted combination thereof, exceeds a predetermined limit. It could alternatively base the decision on whether a ratio of the total area of the schematic diagram to the average instance size exceeds a predetermined limit. That ratio is a measure of the density of objects the display must depict when the entire schematic diagram is shown. Another approach is for the size budgeting step 34 to initially direct program flow to the detailed routing step 38 and to then monitor the time required for step 38 to carry out detailed routing. When the time exceeds a predetermined limit, step 38 times out and size budgeting step redirects program flow to step 42. Thereafter any channels for which detailed routing was not completed at step 38 are routed, when necessary for display, as step 44.

The foregoing specification and the drawings depict exemplary embodiments of the best mode(s) of practicing the invention, and elements or steps of the depicted best mode(s) exemplify the elements or steps of the invention as recited in the appended claims. However, the appended claims are intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

The invention claimed is:

1. A method for processing a netlist describing a circuit as a plurality of cell instances interconnected by nets for carrying signals between the cells, to generate a display of a schematic diagram depicting the circuit including a representation of each cell instance and representations of nets interconnecting the cells instances, and for responding to user input requesting the schematic diagram display to zoom in and pan, the method comprising the steps of:
   a. processing the netlist to determine positions within the schematic diagram for the representations of the cell instances;
   b. generating a display of the schematic diagram including representations of cell instances residing at the positions determined at step a, wherein the schematic diagram display excludes representations of the nets; and
   c. responding to user input requesting the schematic diagram display to zoom in to a smaller first portion of the schematic diagram displayed at step b by determining routes for any representations of nets to be connected to representations of cell instances residing within that second portion of the schematic diagram for which routes have not been previously determined, and then displaying the first portion of the schematic diagram including representations of cell instances and nets.

2. The method in accordance with claim 1 further comprising the step of:
   d. following step c, responding to user input requesting the schematic diagram display to pan to a second portion of the schematic diagram by determining routes for representations of nets to be connected to representations of cell instances residing within that first portion of the schematic diagram, and then displaying the second portion of the schematic diagram including representations of cell instances and the nets.

3. The method in accordance with claim 2
   wherein the schematic diagram is organized into a plurality of elongate first areas (levels) extending in a Y direction and containing representations of the cell instances, the levels being spaced apart in an X direction perpendicular to the Y direction to provide a plurality of elongate second areas (channels) containing representations of the nets, wherein step c comprises the substeps of:
   c1. determining routes for representations of all nets that are to reside only in channels passing through the first portion of the schematic diagram, and then
   c2. displaying the first portion of the schematic diagram including representations of cell instances and nets; and
   wherein step d comprises the substeps of:
   d1. determining routes for representations of all nets that are to reside only in channels passing through the second portion of the schematic diagram for which routes have not yet been previously determined, and then
   d2. displaying the second portion of the schematic diagram including representations of cell instances and nets.

4. The method in accordance with claim 1
   wherein the schematic diagram is organized into a plurality of elongate first areas (levels) extending in a Y direction and containing representations of the cell instances, the levels being spaced apart in an X direction perpendicular to the Y direction to provide a plurality of elongate second areas (channels) containing representations of the nets, and
   wherein step a comprises the substeps of:
   a1. assigning cell instances to the levels in a manner biased toward assigning each cell instance to a level residing in a positive X direction from levels to which any cell instances supplying its input signals are assigned and in a negative X direction from levels to which any instances representation receiving its output: signals are assigned;
   a2. establishing an order in the Y direction in which representations of the cell instances assigned to each level are to appear within that level of the schematic diagram in a manner biased toward minimizing a number of crossovers of representations of nets that are to appear in the schematic diagram; and
   a3. for each cell instance, selecting a position in the Y direction at which a representation of that cell instance is to reside in a manner that maintains order established at step a2.

5. The method in accordance with claim 4 wherein the positions in the Y direction at which a representation of that cell instance is to reside is also selected at step a3 in a manner that is biased toward at least one of minimizing lengths of the representations of nets and minimizing a number of jogs in the representations of the nets.

6. The method in accordance with claim 4 wherein step a further comprises the substep of:
   a4. following step a2, estimating a minimum width for each channel needed to accommodate representations of the nets that are to reside in each channel; and
   a5. selecting a position in the X direction within the schematic diagram for each level in a manner that provides at least the minimum width for each channel estimated at step a4.

7. The method in accordance with claim 6 wherein step a further comprises the substep of:
   a6. determining which net representations must pass through levels in order to link cell instance representations positioned within those levels; and
   a7. for all nets that must pass through at least one level, selecting points at which those nets are to pass through those levels, and adding a representation of a feed through cell instance to the schematic diagram at each selected point.

8. The method in accordance with claim 1
wherein the schematic diagram is organized into a plurality of elongate first areas (levels) extending in a Y direction and containing representations of the cell instances, the levels being spaced apart in an X direction perpendicular to the Y direction to provide a plurality of elongate second areas (channels) containing representations of the nets, and
wherein step c comprises the substeps of:
  c1. determining routes for representations of all nets that are to reside only in channels passing through the first portion of the schematic diagram, and then
  c2. displaying the first portion of the schematic diagram including representations of cell instances and nets.

9. The method in accordance with claim 1 further comprising the step of:
  d. determining routes for representations of some nets that are to reside outside the first portion of the schematic diagram while displaying the first portion of the schematic diagram.

10. A method for processing a netlist describing a circuit as a plurality of cell instances interconnected by nets for carrying signals between the cells, to generate a display of a schematic diagram depicting the circuit including a representation of each cell instance and representations of nets interconnecting the cells instances, and for responding to user input requesting the schematic diagram display to zoom in and pan, the method comprising the steps of:
  a. processing the netlist to determine positions within the schematic diagram for the representations of the cell instances;
  b. making a determination as to whether or not to establish routes for representations of all nets within the schematic diagram before displaying the schematic diagram;
  c. upon determining at step b to immediately establish routes for representations of all nets with the schematic diagram, establishing those routes, and then displaying the schematic diagram;
  d. otherwise upon determining at step b to not establish routes for representations of all nets before displaying the schematic diagram, generating a display of the schematic diagram including representations of cell instances residing at the positions determined at step a, wherein the schematic diagram display excludes representations of the nets, and thereafter responding to user input requesting the schematic diagram display to zoom in to a smaller first portion of the schematic diagram displayed at step b by determining routes for any representations of nets to be connected to representations of cell instances residing within that second portion of the schematic diagram for which routes have not been previously determined, and then displaying the first portion of the schematic diagram including representations of cell instances and nets.

11. The method in accordance with claim 10 wherein the determination made at step b is based on at least one factor having an influence on an amount of time required to establish those routes.

12. The method in accordance with claim 11 wherein the factor comprises a number of nets to be represented in the schematic diagram.

13. The method in accordance with claim 11 wherein the factor comprises a number of cell instances to be represented in the schematic diagram.

14. The method in accordance with claim 10 wherein the determination is made at step b based on at least one factor that is a measure of a cell instance density within the schematic diagram.

15. The method in accordance with claim 14 wherein the factor is a ratio of area of the schematic diagram to an estimate of average area of cell instance representations when the entire schematic diagram is displayed.

16. The method in accordance with claim 10 wherein the determination is made at step b by determining whether it is possible to establish routes for representations of all nets within the schematic diagram within a predetermined time limit.

17. The method in accordance with claim 10 further comprising the step of:
  e. determining routes for representations of some nets that are to reside outside the first portion of the schematic diagram while displaying the first portion of the schematic diagram.

18. Computer-readable media storing software which when read and executed by a computer causes the computer to carry out a method for processing a netlist describing a circuit as a plurality of cell instances interconnected by nets for carrying signals between the cells, to generate a display of a schematic diagram depicting the circuit including a representation of each cell instance and representations of nets interconnecting the cells instances, and for responding to user input requesting the schematic diagram display to zoom in and pan, the method comprising the steps of:
  a. processing the netlist to determine positions within the schematic diagram for the representations of the cell instances;
  b. generating a display of the schematic diagram including representations of cell instances residing at the positions determined at step a, wherein the schematic diagram display excludes representations of the nets; and
  c. responding to user input requesting the schematic diagram display to zoom in to a smaller first portion of the schematic diagram displayed at step b by determining routes for any representations of nets to be connected to representations of cell instances residing within that second portion of the schematic diagram for which routes have not been previously determined, and then displaying the first portion of the schematic diagram including representations of cell instances and nets.

19. The computer-readable media in accordance with claim 18 further comprising the step of:
  d. following step c, responding to user input requesting the schematic diagram display to pan to a second portion of the schematic diagram by determining routes for representations of nets to be connected to representations of cell instances residing within that first portion of the schematic diagram, and then displaying the second portion of the schematic diagram including representations of cell instances and the nets.

20. The computer-readable media in accordance with claim 19
wherein the schematic diagram is organized into a plurality of elongate first areas (levels) extending in a Y direction and containing representations of the cell instances, the levels being spaced apart in an X direction perpendicular to the Y direction to provide a plurality of elongate second areas (channels) containing representations of the nets, and
wherein step c comprises the substeps of:

c1. determining routes for representations of all nets that are to reside only in channels passing through the first portion of the schematic diagram, and then c2. displaying the first portion of the schematic diagram including representations of cell instances and nets; and wherein step d comprises the substeps of:

d1. determining routes for representations of all nets that are to reside only in channels passing through the second portion of the schematic diagram for which routes have not yet been previously determined, and then d2. displaying the second portion of the schematic diagram including representations of cell instances and nets.

21. The computer-readable media in accordance with claim 18
wherein the schematic diagram is organized into a plurality of elongate first areas (levels) extending in a Y direction and containing representations of the cell instances, the levels being spaced apart in an X direction perpendicular to the Y direction to provide a plurality of elongate second areas (channels) containing representations of the nets, and
wherein step a comprises the substeps of:
a1. assigning cell instances to the levels in a manner biased toward assigning each cell instance to a level residing in a positive X direction from levels to which any cell instances supplying its input signals are assigned and in a negative X direction from levels to which any instances representation receiving its output signals are assigned;
a2. establishing an order in the Y direction in which representations of the cell instances assigned to each level are to appear within that level of the schematic diagram in a manner biased toward minimizing a number of crossovers of representations of nets that are to appear in the schematic diagram; and
a3. for each cell instance, selecting a position in the Y direction at which a representation of that cell instance is to reside in a manner that maintains order established at step a2.

22. The computer-readable media in accordance with claim 21 wherein the positions in the Y direction at which a representation of that cell instance is to reside is also selected at step a3 in a manner that is biased toward at least one of minimizing lengths of the representations of nets and minimizing a number of jogs in the representations of the nets.

23. The computer-readable media in accordance with claim 22 wherein step a further comprises the substep of:
a6. determining which net representations must pass through levels in order to link cell instance representations positioned within those levels; and
a7. for all nets that must pass through at least one level, selecting points at which those nets are to pass through those levels, and adding a representation of a feed through cell instance to the schematic diagram at each selected point.

24. The computer-readable media in accordance with claim 21 wherein step a further comprises the substep of:
a4. following step a2, estimating a minimum width for each channel needed to accommodate representations of the nets that are to reside in each channel; and
a5. selecting a position in the X direction within the schematic diagram for each level in a manner that provides at least the minimum width for each channel estimated at step a4.

25. The computer-readable media in accordance with claim 18
wherein the schematic diagram is organized into a plurality of elongate first areas (levels) extending in a Y direction and containing representations of the cell instances, the levels being spaced apart in an X direction perpendicular to the Y direction to provide a plurality of elongate second areas (channels) containing representations of the nets, and
wherein step c comprises the substeps of:
c1. determining routes for representations of all nets that are to reside only in channels passing through the first portion of the schematic diagram, and then
c2. displaying the first portion of the schematic diagram including representations of cell instances and nets.

26. The computer readable media in accordance with claim 18 further comprising the step of:
d. determining routes for representations of some nets that are to reside outside the first portion of the schematic diagram while displaying the first portion of the schematic diagram.

27. Computer-readable media storing software which when read and executed by a computer causes the computer to carry out a method for processing a netlist describing a circuit as a plurality of cell instances interconnected by nets for carrying signals between the cells, to generate a display of a schematic diagram depicting the circuit including a representation of each cell instance and representations of nets interconnecting the cells instances, and for responding to user input requesting the schematic diagram display to zoom in and pan, the method comprising the steps of:

a. processing the netlist to determine positions within the channels for the representations of the cell instances;

b. making a determination as to whether or not to establish routes for representations of all nets to be included in the schematic diagram before displaying the schematic diagram;

c. upon determining at step b to immediately establish routes for representations of all nets with the schematic diagram, establishing those routes, and then displaying the schematic diagram; and d. otherwise upon determining at step b to not establish routes for representations of all nets before displaying the schematic diagram, generating a display of the schematic diagram including representations of cell instances residing at the positions determined at step a, wherein the schematic diagram display excludes representations of the nets, and thereafter responding to user input requesting the schematic diagram display to zoom in to a smaller first portion of the schematic diagram displayed at step b by determining routes for any representations of nets to be connected to representations of cell instances residing within that second portion of the schematic diagram for which routes have not been previously determined, and then displaying the first portion of the schematic diagram including representations of cell instances and nets.

28. The computer-readable media in accordance with claim 27 wherein the determination made at step b is based on at least one factor having an influence on an amount of time required to establish those routes.

29. The computer-readable media in accordance with claim 28 wherein the factor comprises a number of nets to be represented in the schematic diagram.

30. The computer-readable media in accordance with claim 28 wherein the factor comprises a number of cell instances to be represented in the schematic diagram.

31. The computer-readable media in accordance with claim 27 wherein the determination is made at step b based on at least one factor that is a measure of a cell instance density within the schematic diagram.

32. The computer-readable media in accordance with claim 31 wherein the factor is a ratio of area of the schematic diagram to an estimate of average area of cell instance representations when the entire schematic diagram is displayed.

33. The computer-readable media in accordance with claim 27 wherein the determination is made at step b by determining whether it is possible to establish routes for representations of all nets within the schematic diagram within a predetermined time limit.

34. The computer readable media in accordance with claim 27 further comprising the step of:
  e. determining routes for representations of some nets that are to reside outside the first portion of the schematic diagram while displaying the first portion of the schematic diagram.

* * * * *